(12) United States Patent
Long et al.

(10) Patent No.: US 10,486,098 B2
(45) Date of Patent: Nov. 26, 2019

(54) METHOD FOR IMPROVING ADSORPTION CAPABILITY OF FIXED BED AND APPLICATION METHOD THEREOF IN ORGANIC WASTE GAS TREATMENT

(71) Applicant: Nanjing University, Nanjing (CN)

(72) Inventors: Chao Long, Nanjing (CN); Honglei He, Nanjing (CN); Xiaohong Yao, Nanjing (CN); Jian Wu, Nanjing (CN); Lijuan Jia, Nanjing (CN); Liuyan Wu, Nanjing (CN)

(73) Assignee: Nanjing University, Nanjing (CN)

( * ) Notice: Subject to any disclaimer, the term of this patent is extended or adjusted under 35 U.S.C. 154(b) by 155 days.

(21) Appl. No.: 15/742,380

(22) PCT Filed: Aug. 11, 2016

(86) PCT No.: PCT/CN2016/094493
§ 371 (c)(1),
(2) Date: Jan. 5, 2018

(87) PCT Pub. No.: WO2017/028730
PCT Pub. Date: Feb. 23, 2017

(65) Prior Publication Data
US 2018/0193790 A1    Jul. 12, 2018

(30) Foreign Application Priority Data

Aug. 19, 2015 (CN) .......................... 2015 1 5089463

(51) Int. Cl.
*B01D 53/04* (2006.01)
(52) U.S. Cl.
CPC ..... *B01D 53/0423* (2013.01); *B01D 53/0438* (2013.01); *B01D 53/0454* (2013.01);
(Continued)

(58) Field of Classification Search
CPC ................ B01D 53/04; B01D 53/0423; B01D 53/0438; B01D 53/0454; B01D 53/0462;
(Continued)

(56) References Cited

U.S. PATENT DOCUMENTS

| | | | | |
|---|---|---|---|---|
| 5,964,221 A | * | 10/1999 | McKenna | B01D 53/0415 128/201.27 |
| 7,326,280 B2 | * | 2/2008 | Hrycak | A61M 16/22 128/205.28 |

(Continued)

FOREIGN PATENT DOCUMENTS

| | | | |
|---|---|---|---|
| CN | 102423600 A | * | 4/2012 |
| JP | 59-32922 A | * | 2/1984 |

OTHER PUBLICATIONS

Machine-generated English translation of CN 102423600 A, published Apr. 2012.*

(Continued)

*Primary Examiner* — Frank M Lawrence, Jr.
(74) *Attorney, Agent, or Firm* — Zhihua Han; WEN IP LLC

(57) ABSTRACT

The present invention disclosed a method for improving the adsorption capacity of a fixed bed and its application in organic waste gas treatment field. The steps are: (1) adsorption: organic waste gas is passed through the adsorption column containing the adsorbent to allow the organic waste to be adsorbed; when VOCs concentration at the outlet end of the adsorption column reached a preset value, the adsorption is halted; (2) desorption: adsorbent that has absorbed VOCs was desorbed by water vapor of 110° C. or higher, or hot nitrogen of 150° C. or higher; the desorbed VOCs enter into a condenser and is recovered in liquid state; (3) pre-adsorption of water: spray water inside the adsorption column after the desorption to adjust the water content of the (Continued)

adsorbent to 8-35%, no other treatment is necessary before the next batch of VOCs adsorption.

8 Claims, 2 Drawing Sheets

(52) U.S. Cl.
CPC .... *B01D 53/0462* (2013.01); *B01D 2253/104* (2013.01); *B01D 2253/106* (2013.01); *B01D 2257/708* (2013.01); *B01D 2257/80* (2013.01); *B01D 2259/402* (2013.01)

(58) Field of Classification Search
CPC ........ B01D 2253/104; B01D 2253/106; B01D 2253/1085; B01D 2257/708; B01D 2257/80; B01D 2259/402; Y02A 50/235
USPC .................................. 95/114, 141, 143, 148
See application file for complete search history.

(56) References Cited

U.S. PATENT DOCUMENTS

| | | | |
|---|---|---|---|
| 8,840,706 B1 * | 9/2014 | Srinivasachar | ........ B01J 20/043 95/139 |
| 10,252,214 B2 * | 4/2019 | Okumura | ............... B01D 53/08 |

OTHER PUBLICATIONS

Machine-generated English translation of JP 59-32922 A, published Feb. 1983.*

* cited by examiner

METHOD FOR IMPROVING ADSORPTION CAPABILITY OF FIXED BED AND APPLICATION METHOD THEREOF IN ORGANIC WASTE GAS TREATMENT

CROSS-REFERENCE TO RELATED APPLICATION

This application is a national stage application of International application number PCT/CN2016/094493, filed Aug. 11, 2016, titled "METHOD FOR IMPROVING ADSORPTION CAPABILITY OF FIXED BED AND APPLICATION METHOD THEREOF IN ORGANIC WASTE GAS TREATMENT", which claims the priority benefit of Chinese Patent Application No. 2015105089463, filed on Aug. 19, 2015, which is hereby incorporated by reference in its entirety.

TECHNICAL FIELD

The present invention is related in general to the field of organic waste gas treatment; and more specifically to a method for reducing temperature increase of a fixed bed containing adsorbent during the adsorption process and improving adsorption capacity of the adsorbent, as well as the application method in the field of organic waste gas adsorption treatment.

BACKGROUND

Benzene, ketones, esters, alcohols, ethers and halogenated hydrocarbons and other organic compounds in the chemical industry, pesticides, pharmaceutical and other industries are widely used as organic solvents. Due to their low boiling point and high volatility, large amounts of organic waste gas are routinely produced in their production and application processes. Direct evaporation or gasification of Volatile organic compounds (VOCs) not only results in the waste of resources, but also lead to a series of problems in health, environment, and safety. One mainstream technologies for industrial organic waste gas treatment is fixed bed adsorption; however, because adsorption is an exothermic process, the adsorption exotherm causes a temperature increase of the fixed bed, which adversely affects the adsorption, reduces the adsorption capacity, and even creates safety risks. As reported in literature, when activated carbon was used to adsorb acetone at a concentration of 50 mg/L, the maximum temperature during the process reached 40° C.; when the acetone concentration is 100 mg/L, the maximum temperature rose to 80° C. (P. Le Cloirec, P. Pré, F. Delage, S. Giraudet, Visualization of the exothermal VOC adsorption in a fixed-bed activated carbon adsorber, Environmental Technology, 2012, 2 (33):285-290). High-temperature increases not only reduce the adsorption capacity of activated carbon in acetone, but also lead to serious deterioration of activated carbon, and even fire and other safety incidents.

Faced with the challenge to neutralize the negative impact of the exothermic process during adsorption, solutions in prior arts are concentrated on modifying the internal structure or the container wall heat-exchange structure of the fixed bed, in order to accelerate the outward heat transfer thus the lower temperature of the bed. For example, heat transfer pipes can be included within the bed that can facilitate heat exchange with outside environment; cold fluid moves through the pipes and removes heat through cross-wall heat transfer and maintain the bed temperature approximately constant. For example, Chinese patent application number 201010175816.X, published on Nov. 16, 2011, discloses an adsorption bed and an organic waste gas purification system associated with the adsorption bed. The adsorption bed includes a front wind cover, a bed body, and a rear wind cover. The front wind cover is provided with an adsorption inlet and a desorption outlet; the rear wind cover is provided with an adsorption outlet and a desorption inlet; the bed body comprises a plurality of activated carbon layers. The front windshield is provided with an air collecting manifold, and a plurality of horizontally extended collecting slots, each of the collecting slots is opposite to an activated carbon layer, all the collecting slots are connected to the gas collecting manifold, and the air collecting manifold is connected to the desorption outlet. The invention also provides an organic waste gas purification system using the adsorption bed. The adsorption bed and the organic waste gas purification system of the invention can effectively avoid the excessive concentration of heat in the adsorption bed during the desorption process; the excessive concentration might have resulted in accidents such as spontaneous combustion of gas or activated carbon fire. However, because of commonly used inorganic and organic adsorbents, such as activated carbon, are poor heat conductors with inefficient heat transfer capabilities, the method disclosed in this patent requires large numbers of pipes to increase heat-exchanging area and heat-exchanging capacity in order to effectively lower bed temperature. As a result, the effective filling space for adsorbent within the adsorption bed is reduced, equipment investment cost is increased, and treatment capacity is reduced.

The fixed bed process is the prevalent process in organic waste adsorption treatment. Because the adsorption of VOCs on the adsorbent is an exothermic process, especially when dealing with high concentrations VOCs, the release of heat often causes a temperature increase of the fixed bed. The temperature increase not only adversely affects the adsorption and reduces adsorption capacity, but also may bring safety hazard and cause a fire, explosion or other accident. Therefore, reducing the temperature of the bed effectively has always been a key technical issue to be solved in this field.

SUMMARY

1. Problems

By focusing on providing a solution to the high equipment investment cost, low processing capacity, and attendant safety risks that are associated with the current approaches in lowering adsorption bed temperature, this invention provided a method for improving the adsorption capacity of the fixed bed and its application in the field of organic waste gas treatment. Taking advantage of the hydrophobic adsorbent resin or molecular sieve, this invention provides an effective means to reduce the temperature of the fixed bed during adsorption and a method to improving the adsorption capacity by adjusting the initial water content of an adsorbent. The method is simple and easy to operate, does away with the need to modify the internal structure or the container wall heat-exchange structure of the fixed bed. The cost of implementing the method is low, but the effect is substantial.

2. Technical Solutions

In order to solve the above problem, the technical solution adopted by the present invention is as follows:

A method for improving the adsorption capacity of a fixed bed, comprising adjusting the initial water content of the adsorbent so that the adsorbent moisture content is 8-35%;

The method for improving the adsorption capacity of the fixed bed as applied in the field of organic gas waste adsorption treatment, further comprising the steps of:

(1) adsorbing, wherein an organic waste gas is passed into an adsorption column loaded with the adsorbent and absorbed by the adsorbent;

(2) desorbing, wherein the adsorbent that has adsorbed the organic waste from step 1 is desorbed, and the desorbed organic waste is let into a condenser and collected in liquid form;

(3) pre-adsorbing water, wherein after desorbing in step 2, water is sprayed inside the adsorption column, and water content of the absorbent in the desorbed adsorption column is adjusted; and (4) re-adsorbing, wherein the adsorbent that has pre-adsorbed water in step 3 is applied to adsorb an organic waste gas as in step 1.

Preferably, the adsorbent is a macroporous adsorption resin with a backbone made from styrene-divinylbenzene copolymer or an ultra-high cross-linked adsorption resin.

Preferably, the adsorbent is a molecular sieve with a silica to alumina ratio equal or higher than 30 or a fully-silicated molecular sieve.

Preferably, the absorbing in step 1 is operated under normal temperature and normal pressure, and the adsorption is halted when the concentration of the organic waste gas at an outlet of the adsorption column reaches a preset value.

Preferably, in performing the absorbing in step 1, water was first sprayed inside the adsorption column loaded with the adsorbent, and the water content of the adsorbent is adjusted, then the organic waste gas is passed into the adsorption column loaded with the adsorbent and is adsorbed.

Preferably, the desorbing of step 2 is achieved by water vapor of 110° C. or higher, or by hot nitrogen of 150° C. or higher.

Preferably, the adjustment of the water content of the absorbent in the desorbed adsorption column as performed in step 3 is operated as such that the water content is adjusted to 8-35%.

Preferably, two or more adsorption columns loaded with the adsorbent are used alternately; when one of the two or more adsorption columns undergoes the step 1 of adsorbing, the other or more adsorption columns undergo desorbing of step 2 or pre-adsorbing water in step 3, simultaneously or substantially simultaneously.

The adsorption of Volatile organic compounds (VOCs) to the adsorbent is an exothermic process that causes a temperature increase of the fixed bed; as a result, it adversely affects the adsorption, reduces adsorption capacity, and even engenders safety hazards. How to effectively reduce the bed temperature has been a key technical problem to be solved in the art. Adsorbents commonly used in the industry include activated carbon, activated carbon fiber, molecular sieves, silica gel, and adsorption resin, among others. They can be classified into two classes in accordance with their surface affinity to water molecules: hydrophilic adsorbent and hydrophobic adsorbent. In hydrophilic adsorbent such as activated carbon, water molecules will occupy effective adsorption binding sites due to its strong affinity to the adsorbent surface. Thus, it has long been an accepted rule that water vapor or water in adsorbent has a significant negative impact towards VOCs adsorption and must be avoided. The inventor(s) of this invention, through many years of experience and thoughtful observation, made the unexpected and paradoxical discovery that pre-adsorbing an appropriate amount of water to hydrophobic adsorbent can benefit subsequent adsorption of VOCs by effectively solving the problem of the bed temperature increase. The underlying rational is as follows: an appropriate amount of water would not reduce VOCs adsorption to hydrophobic resins because hydrophobic adsorption material such as polystyrene-based adsorption resin and high silicate to aluminum ratio molecular sieves have much weaker affinity to water molecules compared to VOCs. As a result, water molecules would not inhibit VOCs adsorption to the hydrophobic resin; pre-adsorbed water molecules might be displaced by VOCs. Meanwhile, because water has a high specific heat capacity and its desorption is an endothermic process, pre-adsorbing appropriate amount of water onto an adsorbent can effectively absorb those heat released in the VOCs adsorption process. Thus, by adjusting the initial water content within an adsorbent, we can effectively control the temperature rise within the system and avoid any negative impact on VOCs adsorption. By experimenting with proper hydrophobic adsorbent and the amount of pre-adsorbed water, VOCs adsorption is basically unaffected by the presence of water molecules. Accordingly, the present invention is directed to using a hydrophobic adsorption resin or a molecular sieve to treat organic waste gas, by providing a method of effectively reducing the adsorbent bed temperature and improving adsorption capacity, through adjusting the initial water content of the adsorbent.

3. Beneficial Effect

Compared with the prior art, the beneficial effects of the present invention are as follows:

(1) By utilizing the differential affinity of the hydrophobic adsorbent towards water and VOCs, this invention provided a method for controlling the temperature the fixed bed and improving adsorption capacity of the adsorbent, by adjusting the initial water content of the adsorbent. When the water content of the adsorbent is 8-35%, the increase in the bed temperature is less than 20° C., a 50% more reduction compared to a dry resin. Furthermore, VOCs adsorption amount is increased by 10% compared to the dry resin.

(2) The advantage of this method includes low cost, simple and easy to operate, and significant effect. In addition, it does not require modifying the internal structure or the container wall heat-exchange structure of the fixed bed.

Figure 1:
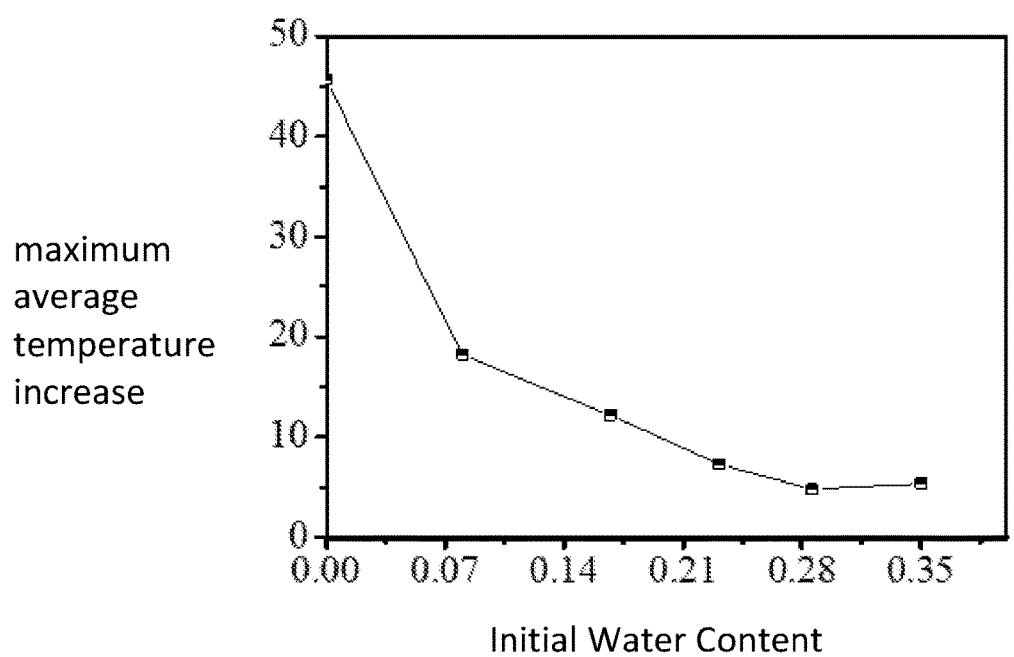
FIG. 1 shows the relationship between the initial water content and the maximum average temperature increase during the adsorption process for the ultra-high cross-linked adsorption resin Dowex Optipore V503.

Still, other embodiments of the present invention will become readily apparent to those skilled in the art from the following detailed description, wherein is described embodiments of the invention by way of illustrating the best mode contemplated for carrying out the invention. As will be realized, the invention is capable of other and different embodiments, and its several details are capable of modifications in various obvious respects, all without departing from the spirit and the scope of the present invention.

Accordingly, the drawings and detailed description are to be regarded as illustrative in nature and not as restrictive.

DETAILED DESCRIPTION OF THE PREFERRED EMBODIMENTS

The examples are further provided below.

Example 1

(1) In a 50 mm diameter adsorption column, 120 g (dry basis) of ultra-high cross-linked adsorption resin Dowex Optipore V503 (available from DOW Corporation of the U.S.A. with a styrene-divinylbenzene copolymer backbone having a specific surface area of about 1100 $m^2/g$ and an average pore diameter of 3.4 nm). Thermocouples were installed in the center of the adsorption column at the height of 50 mm, 100 mm and 150 mm, respectively. The thermocouple was connected with the temperature data collector to transmit the real-time temperature to the computer for recording;

(2) Adopt the bubbling gas distribution method to obtain the dichloroethane steam with a concentration of 200 mg/L, and pass the gas into the adsorption column from step (1) for adsorption, and halt when the dichloroethane concentration at the outlet of the adsorption column reaches 5 mg/L. At this time, the maximum average temperature increase at the three temperature measurement points was 47.5° C. and the breakthrough adsorption amount was 436 mg/g;

(3) The ultra-high cross-linked adsorption resin Dowex Optipore V503 that adsorbed dichloroethane in step (2) was desorbed by steam at 110° C. for 30 minutes, and the desorbed steam was passed into a condenser to recover liquid organic waste gas;

(4) The ultra-high cross-linked adsorption resin Dowex Optipore V503 from step (3), which had underdone desorption, is subjected to steps (2) and (3) to carry out the next batch of adsorption-desorption operations. The maximum average temperature increase and the breakthrough adsorption amount remained unchanged.

Example 2

The procedure is the same as in Example 1, except that before the adsorption of dichloroethane, water was sprayed into the adsorption column to make the initial water content of the adsorbent resin at 8%, and the other conditions are unchanged. The maximum average temperature increase of the three temperature measuring points is 18.2° C., and the breakthrough adsorption amount was 490 mg/g.

Example 3

The procedure is the same as in Example 2, except that before the adsorption of dichloroethane, water was sprayed into the adsorption column to make the initial water content of the adsorbent resin at 23%, and the other conditions are unchanged. The maximum average temperature increase of the three temperature measuring points is 6.7° C., and the breakthrough adsorption amount was 600 mg/g.

Example 4

The procedure is the same as in Example 2, except that before the adsorption of dichloroethane, water was sprayed into the adsorption column to make the initial water content of the adsorbent resin at 35%, and the other conditions are unchanged. The maximum average temperature increase of the three temperature measuring points is 5.2° C., and the breakthrough adsorption amount was 505 mg/g.

FIG. 1 shows the relationship between the initial water content and the maximum average temperature increase as measured by the three points during the adsorption process for the ultra-high cross-linked adsorption resin Dowex Optipore V503.

Figure 2:
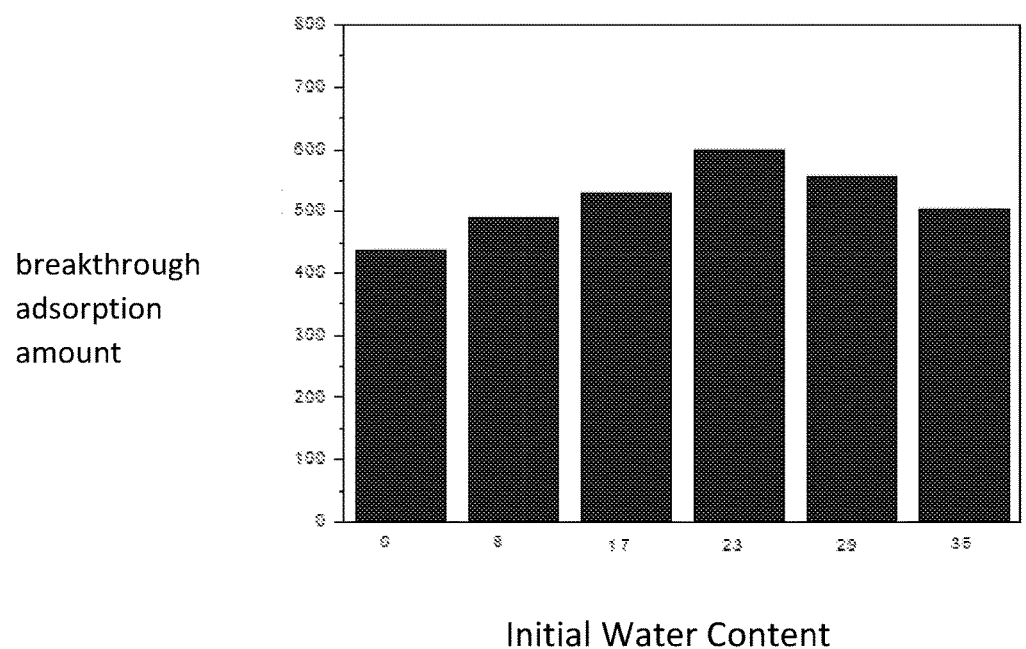
FIG. 2 shows the relationship between the initial water content and breakthrough adsorption amount for the ultra-high cross-linked adsorption resin Dowex Optipore V503.

FIG. 2 shows the relationship between the initial water content and breakthrough adsorption amount for the ultra-high cross-linked adsorption resin Dowex Optipore V503.

Example 5

The procedure is the same as in Example 1, except that in step (1), the super-high cross-linked adsorption resin Dowex Optipore V503 is changed to macroporous adsorption resin XAD-4 (available from Rohm & Haas Company of America, the backbone is styrene-benzene copolymer with a specific surface area of about 800 $m^2/g$ and an average pore diameter of 6.4 nm). The desorption conditions in step (3) were replaced with the hot nitrogen of about 150° C. for 30 minutes. Other conditions were unchanged. The maximum average temperature increase at the three temperature measurement points is 34.8° C., and the breakthrough adsorption amount is 288 mg/g.

Example 6

The procedure is the same as in Example 3, except that before the adsorption of dichloroethane, water was sprayed into the adsorption column to make the initial water content of the adsorbent resin at 8%, and the other conditions are unchanged. The maximum average temperature increase of the three temperature measuring points is 12.1° C., and the breakthrough adsorption amount was 324 mg/g.

Example 7

The procedure is the same as in Example 1, except that the super-high cross-linked adsorption resin Dowex Optipore V503 in step (1) is replaced by ZSM-5 molecular sieve with Si/Al=30 (available from Shanghai Bonjour Chemical Technology Co., Ltd.). Other conditions Unchanged, the maximum average temperature increase at the three temperature measurement points was 52.4° C., and the breakthrough adsorption amount was 418 mg/g.

Example 8

The procedure is the same as in Example 7, except that before the adsorption of dichloroethane, water was sprayed into the adsorption column to make the initial water content of the ZSM-5 molecular sieve at 15%, the other conditions are unchanged, and the maximum average temperature increase at the three temperature measurement points was 18.8° C. and the breakthrough adsorption amount was 504 mg/g.

Example 9

The procedure is the same as in Example 7, except that before the adsorption of dichloroethane, water was sprayed into the adsorption column to make the initial water content of the ZSM-5 molecular sieve at 25%, the other conditions are unchanged, and the maximum average temperature increase at the three temperature measurement points was 8.0° C. and the breakthrough adsorption amount was 564 mg/g.

Example 10

The procedure is the same as in Example 1, except that the super-high cross-linked adsorption resin Dowex Optipore V503 in step (1) is replaced by all silicon molecular sieve SBA-3 (available from Shanghai Bonjour Chemical Technology Co., Ltd.). Other conditions Unchanged, the maximum average temperature increase at the three temperature measurement points was 41.9° C., and the breakthrough adsorption amount was 386 mg/g.

Example 11

The procedure is the same as in Example 10, except that before the adsorption of dichloroethane, water is sprayed into the adsorption column to make the initial water content of the SBA-3 molecular sieve at 8%, the other conditions are unchanged, and the maximum average temperature increase at the three temperature measurement points was 15.4° C. and the breakthrough adsorption amount was 463 mg/g.

Example 12

The procedure is the same as in Example 1, except that 200 mg/L of dichloroethane steam is replaced with 100 mg/L of toluene vapor, the other conditions remain unchanged, and the maximum average temperature increase at the three temperature measurement points is 45.4° C., and the breakthrough adsorption amount is 474 mg/g.

Example 13

The procedure is the same as in Example 12, except that before the adsorption of toluene, water was sprayed into the adsorption column to make the initial water content of the adsorption resin at 15%, the other conditions are unchanged, and the maximum average temperature increase at the three temperature measurement points was 11.9° C. and the breakthrough adsorption amount was 586 mg/g.

The Maximum Average Bed Temperature Increase and Breakthrough Adsorption Amount for Examples 1-13

| Embodiments | Maximum Temperature Increase, measured ° C. | | | Max. Average Temp. Increase ° C. | Breakthrough Adsorption Amount, mg/g |
|---|---|---|---|---|---|
| | 50 mm | 100 mm | 150 mm | | |
| 1 | 45.0 | 47.3 | 50.2 | 47.5 | 436 |
| 2 | 17.1 | 18.4 | 19.2 | 18.2 | 490 |
| 3 | 6.0 | 6.6 | 7.5 | 6.7 | 600 |
| 4 | 4.9 | 5.2 | 5.5 | 5.2 | 505 |
| 5 | 33.6 | 34.5 | 36.2 | 34.8 | 288 |
| 6 | 11.4 | 12.2 | 12.8 | 12.1 | 324 |
| 7 | 49.2 | 52.3 | 55.8 | 52.4 | 418 |
| 8 | 16.4 | 18.8 | 21.2 | 18.8 | 504 |
| 9 | 6.5 | 7.9 | 9.6 | 8.0 | 564 |
| 10 | 38.4 | 41.6 | 45.7 | 41.9 | 386 |
| 11 | 14.3 | 15.1 | 16.7 | 15.4 | 463 |
| 12 | 42.6 | 45.2 | 48.3 | 45.4 | 474 |
| 13 | 10.5 | 11.7 | 13.4 | 11.9 | 586 |

Note:
1. The maximum temperature increase of the temperature measurement point is the difference between the highest temperature at the temperature measurement point and the initial temperature before adsorption in the adsorption process;
2. The maximum average temperature increase is the arithmetic mean of the maximum temperature increase at the three temperature measurement points of 50 mm, 100 mm and 150 mm.
3. In all Embodiments, the penetration point was set at 2.5% of the inlet concentration and the breakthrough adsorption amount was the difference between the mass of the adsorbent (m2) at the point of adsorption reaching the penetration point and the initial mass of the adsorbent (m1), divided over the initial mass of the adsorbent (m1), that is, the penetration of adsorption = (m2-m1)/m1.

While the invention has been particularly shown and described as referenced to the embodiments thereof, those skilled in the art will understand that the foregoing and other changes in form and detail may be made therein without departing from the spirit and scope of the invention.

What is claimed is:

1. A method for improving the adsorption capacity of a fixed bed as applied in the field of organic gas waste adsorption treatment, comprising the steps of:
    (1) adjusting an initial water content of an adsorbent so that the initial water content is in the range of 8-35 WT %;
    (2) adsorbing, wherein an organic waste gas is passed into an adsorption column loaded with the adsorbent and absorbed by the adsorbent;
    (3) desorbing, wherein the adsorbent that has adsorbed the organic waste from step 2 is desorbed, and the desorbed organic waste is let into a condenser and collected in liquid form;
    (4) pre-adsorbing water, wherein water is sprayed inside the adsorption column and water content of the absorbent in the desorbed adsorption column is adjusted; and
    (5) re-adsorbing, wherein the adsorbent that has pre-adsorbed water in step 4 is applied to adsorb an organic waste gas as in step 2.

2. A method for improving the adsorption capacity of the fixed bed according to claim 1, as applied in the field of organic gas waste adsorption treatment, wherein a temperature increase in the fixed bed is reduced; and wherein the adsorbent is a macroporous adsorption resin with a backbone made from styrene-divinylbenzene copolymer or an ultra-high cross-linked adsorption resin.

3. A method for improving the adsorption capacity of the fixed bed according to claim 1, as applied in the field of organic gas waste adsorption treatment, wherein the temperature increase in the fixed bed is reduced; and wherein the adsorbent is a molecular sieve with a silica to alumina ratio equal or higher than 30 or a fully-silicated molecular sieve.

4. A method for improving the adsorption capacity of the fixed bed according to claim 1, as applied in the field of organic gas waste adsorption treatment, wherein the temperature increase in the fixed bed is reduced; and wherein the absorbing is operated under normal temperature and normal pressure, and the adsorption is halted when the concentration of the organic waste gas at an outlet of the adsorption column reaches a preset value.

5. A method for improving the adsorption capacity of the fixed bed according to claim 1, as applied in the field of organic gas waste adsorption treatment, wherein the temperature increase in the fixed bed is reduced; and further comprising the steps of:

spraying water inside the adsorption column loaded with the adsorbent and adjusting the water content of the adsorbent; and passing the organic waste gas into the adsorption column loaded with the adsorbent to adsorb the organic wastes.

6. A method for improving the adsorption capacity of the fixed bed according to claim 1, as applied in the field of organic gas waste adsorption treatment, wherein the temperature increase in the fixed bed is reduced; and wherein the desorbing is performed by water vapor of 110° C. or higher, or by hot nitrogen of 150° C. or higher.

7. A method for improving the adsorption capacity of the fixed bed according to claim 1, as applied in the field of organic gas waste adsorption treatment, wherein the temperature increase in the fixed bed is reduced; and wherein the water content of the absorbent in the desorbed adsorption column is adjusted to 8-35 WT %.

8. A method for improving the adsorption capacity of the fixed bed according to claim 1, as applied in the field of organic gas waste adsorption treatment, wherein the temperature increase in the fixed bed is reduced; and further comprising operating two or more adsorption columns loaded with the adsorbent, wherein one of the two or more adsorption columns undergoes the step 2 of claim 1, whereas the rest of the two or more adsorption column undergoes the steps 3 or 4 of claim 1, in substantially contemporaneous manner.

* * * * *